Patented Nov. 1, 1949

2,486,572

UNITED STATES PATENT OFFICE 2,486,572

PREPARATION OF TITANIUM CHLORIDE SOLUTIONS

Carl Marcus Olson, Hayden Park, and Ignace Joseph Krchma, Wilmington, Del., assignors to E. I. du Pont de Nemours & Company, Wilmington, Del., a corporation of Delaware No Drawing. Application January 19, 1943, Serial No. 472,876

6 Claims. (Cl. 23—87)

This invention relates to the preparation of titanium chloride solutions useful in titanium oxide, especially rutile, pigment manufacture, and more particularly to the novel methods for obtaining relatively pure forms of such solutions from titanium sulfate solutions.

Titanium oxide occurs in three crystalline forms, namely, anatase, brookite and rutile. Two of these, anatase and rutile, comprise the most useful forms for pigment purposes, while the third, brookite, remains of interest solely as a product of nature. Anatase has a refractive index of 2.52 as compared to 2.71 for rutile, the higher potential hiding power of the latter clearly emphasizing its greater desirability as a pigment.

The majority of present-day commercial $TiO_2$ pigments are characteristically in the lower (anatase) refractive index modification, principally because of the availability of more economical and commercially attarctive methods for producing them from titanium sulfate solutions which are obtained upon sulfuric acid dissolution of titaniferous ores, such as ilmenite. Rutile may be obtained from chloride solutions, but an extremely difficult and costly type of operation is required in which serious corrosion problems always exist and careful controls over the process must at all times be exercised. Hence, such processes are presently non-adaptable for commercial usage or exploitation.

Titanium salt solutions, and especially those employed in $TiO_2$ pigment manufacture, vary greatly in nature, their characteristics in a large measure being dependent upon the methods which are resorted to in effecting their preparation. Thus, solutions prepared from orthotitanic acid and sulfuric acid are considerably different in their behavior from those prepared from solutions of crystalline titanyl sulfate in water, or from solutions prepared by the action of sulfuric acid on titanium minerals. These differences exist even though the solutions may be substantially the same in chemical composition. Thus, the titanium may be present as a true solution or in a hydrolized condition substantially approaching colloidal dispersion. While these variations from true solutions may be regarded as due to polymerization, to hydration, or to association, regardless of explanation or cause, they do vary in uniformity, stability, ease of hydrolysis, etc.

When hydrous titanium oxide, such as results from hydrolyzing a titanium sulfate solution in accordance with, for instance, U. S. Reissue Patent 18,854, is calcined in the temperature range of from about 900° C. to 1000°., pigment anatase results. If the calcination is conducted at higher temperatures and considerably above 1000° C., 1050° C. or 1100° C., or higher, conversion occurs and the final product comprises rutile. However, conversion of the precipitate by use of these high temperatures fails to provide a product having the potential higher hiding power and tinting strength of the higher, rutile, modification. In these processes, particle size and other pigment characteristics become sacrificed during the high temperature treatment and render the ultimate product too coarse in nature to afford maximum hiding power. Thus, objectionable sintering with accompanying undesired growth in particle size, grit and aggregate formation occurs, all of which is reflected in the relatively poor color, brightness, texture, tinting strength and hiding power of the final product. Being poor in hiding power and color and lacking other necessary pigment characteristics, said product is often wholly unfit for many intended uses, especially in coating compositions, such as paints, enamels and lacquers, wherein the pigment must possess these essential properties. As a consequence, high temperature conversion processes are more or less useless for commercial rutile production.

It has been found that precipitated anatase, and more especially hydrolysates from titanium sulfate solutions nucleated in accordance with a novel hydrolysis operation employing a special type of seeding agent, will readily convert to rutile to provide a high quality pigment without recourse to the previously required excessive conversion temperatures and that most effective and optimum results accrue thereunder when the nuclei or seeding agent comprises a product which results from the specially-prepared, relatively pure types of titanium chloride solutions of this invention. It has been also determined that the past history, the method of preparing and the treatments accorded the titanium chloride solution prior to its use in forming the seeding nuclei have an important bearing upon the quality and effectiveness of said nuclei, upon the quality of the hydrolysate derived from its use, and upon the ultimate characteristics of the rutile pigment itself.

Titanium chloride solutions may be obtained in various ways, e. g., by a metathetical reaction, by dissolving anhydrous titanium tetrachloride in water or dilute acid, or by dissolving orthotitanic acid in hydrochloric acid. Theoretically, these solutions should be identical in character, but actually such has not been found to be the case. As stated, titanium solutions vary in stability, uniformity, and hydrolysis characteristics, etc., and consequently markedly affect the quality of a nucleating agent derived therefrom, the nature of the raw pigment precipitate obtained from nuclei use and the nature of the final calcined pigment itself.

It is among the specific objects of this invention to provide a novel method for preparing relatively stable, uniform types of titanium chloride solutions which are oustandingly effective in and useful for manufacturing seed nuclei employable in the hydrolysis of titanium salt solutions, especially titanium sulfate. An additional object is to provide a novel method for preparing a titanium chloride solution from solutions of titanium sulfate. Other objects will be apparaent from the following description of the invention.

These and other objects are attainable in this invention which comprises successively treating a titanium sulfate solution with differing alkaline earth metal chlorides and in amounts sufficient to precipitate substantially all of the sulfate ions present therein, thence removing the precipitates which form as a result of each treatment, and recovering for use the relatively pure titanium chloride solution which results.

In a more specific and preferred embodiment, the invention comprises initially treating a substantially iron-free titanium sulfate solution, such as results from the sulfuric acid dissolution of precipitated metatitanic acid, with sufficient calcium chloride to precipitate, as calcium sulfate, from about 70% to 95% of its total sulfate content, separating the precipitate from the titanium liquor, treating the remaining, partially purified titanium solution with an amount of barium chloride substantially equivalent to the residual sulfate content thereof, and then, after removal of the precipitated barium sulfate formed as a result of said barium chloride treatment, recovering the purified titanium chloride solution.

In one practical adaptation of the invention, a titanium sulfate solution is first reacted through admixture with a solution of calcium chloride, the latter being in sufficient amount to precipitate, as slightly soluble calcium sulfate, from about 70%–95%, and preferably from about 80%–90%, of the sulfate content of said titanium solution. Any suitable type of titanium sulfate liquor may be used in the reaction but preferably one which is substantially free of iron or other undesired impurities is employed. One which is especially suitable for the purpose comprises that resulting from the dissolution in relatively strong excess sulfuric acid of a $TiO_2$ hydrolysate, preferably precipitated metatitanic acid obtained, for instance, from the hydrolysis of a nucleated titanium salt solution, particularly titanium sulfate, in accordance with the methods described in U. S. Reissue Patents 18,854 or 18,790. Said dissolution is preferably conducted at elevated temperatures (say, about 150 C.) and while maintaining substantially liquid conditions at all times, in order to obtain a final solution containing about 2.7 mols of sulfuric acid per mol of $TiO_2$ present. The resulting solution may be treated, if desired, with sufficient relatively pure calcium carbonate, or other alkaline agent capable of yielding an insoluble sulfate, to reduce its sulfuric acid content to a point where a ratio of acid to titanium of only about 1.7 mols of $H_2SO_4$ per mol of $TiO_2$ is present. The amount of alkaline carbonate so employed is obviously variable over wide limits, or, as indicated, may be omitted altogether, depending upon the constitution of the titanium sulfate solution to be ultimately prepared and the particular wishes of the operator. Following calcium sulfate precipitation, removal of the precipitate from the titanium liquor is then effected and in accordance with any convenient or desired method, such as by settling, decanting, filtering, etc., to recover a titanium liquor containing, preferably, from about 80–150 g. $TiO_2/l$. The resulting partially-purified liquor is then treated with an amount of barium chloride solution sufficient to react with and substantially completely remove, as precipitated insoluble barium sulfate, all sulfate ions which remain therein, care being taken in this phase of the process, however, to regulate the barium chloride introduction so as to avoid, preferably, the presence at any time in the liquor of a substantial excess of barium. The barium sulfate precipitate is then removed from the liquor by filtering, decanting or otherwise, and the relatively pure, impurity-free titanium chloride solution which remains may be then employed in various uses. Because of its exceedingly high state of purity, said liquor is eminently suited for preparing $TiO_2$ seeding agents to be used in nucleating and accelerating titanium salt solution hydrolyses, especially solutions of titanium sulfate.

To a more complete understanding of the invention, the following illustrative examples are given, which obviously are not to be considered as in limitation of the invention:

Example I

The titanium sulfate solution used in this example was obtained by dissolving of raw pigment hydrolyzate in sulfuric acid. The solution analyzed 230 grams $TiO_2$/liter and 770 grams $H_2SO_4$/liter.

Equipment used in converting the sulfate solution to chloride solution consisted of three containers or tanks, two of which were used for storage of the reactants, the third being used as a reaction vessel. The reactant storage tanks contained equal volumes of the titanium sulfate solution and calcium chloride solution, the latter containing 550 grams $CaCl_2$/liter and 200 grams of suspended $CaCO_3$/liter. The reactants were introduced into the reaction tank from said storage tanks and in the proportions indicated, a period of about two hours being allowed for the addition. The temperature in the reaction tank was maintained within the range of 35–50° C. during the strike and under these conditions the calcium sulfate precipitated as gypsum. The resulting slurry of gypsum crystals in titanium chloride was then filter-pressed to remove solids, after which it was ready for further treatment to remove the remaining sulfate. The latter operation comprised adding a minor amount of barium chloride (less than .5# $BaCl_2$/lb. of $TiO_2$) to the solution. The endpoint was carefully adjusted to be slightly on the barium side and in order to avoid all traces of $SO_4$ ions. The solution was again filtered and was found to be in a relatively high state of purity, well adapted for the preparation of seed nuclei for the hydrolysis of the titanium sulfate solutions, which nuclei, when prepared therefrom, were found to impart easy rutile conversion characteristics to an anatase hydrolysate.

Example II

One volume of a titanium sulfate solution analyzing 210 grams $TiO_2$/liter and 520 grams $H_2SO_4$/liter was mixed with an equal volume of a calcium chloride solution analyzing 500 grams $CaCl_2$/liter. The combination of these was made by slowly adding the calcium chloride to the titanium sulfate with agitation and care being exercised that the temperature of the reaction vessel did not go above about 35° C. At the end of the addition the solution had been largely converted to titanium chloride which served as a suspension medium for the calcium sulfate. The latter was removed by filtration and the titanium chloride solution was then reacted with the necessary amount of a saturated barium chloride solution to remove substantially all sulfate ions. The resulting insoluble barium sulfate was then removed by filtration and a relatively pure titanium chloride solution resulted which was well suited for the production of titanium hydrolysis seed nuclei.

Although described above in its application to certain specific and preferred embodiments, the invention is not, as already stated, limited thereto. Thus, while the preferred starting titanium sulfate solution comprises one substantially free of iron or other metallic impurities and has an $H_2SO_4$—$TiO_2$ molar ratio of about 1.5 to 2.5 or higher, other forms of titanium sulfate, from whatever source, may be also used, provided they contain in excess of substantially 1.2 mols of $H_2SO_4$ per mol of $TiO_2$. Furthermore, in lieu of preparing the sulfate solution through concentrated $H_2SO_4$, elevated temperature-dissolution of a $TiO_2$ hydrolysate obtained from hydrolysis of a titanium salt (sulfate, nitrate, chloride, etc.) in accordance with, for instance, the methods described in U. S. Reissue Patents 18,854 or 18,790 or in U. S. Patent 2,062,133, said solution may be otherwise conveniently prepared such as by dissolving, in relatively dilute sulfuric acid and at room temperatures, precipitated orthotitanic acid obtained, for instance, by neutralizing a titanium salt solution with an alkali or alkaline earth metal hydroxide, especially sodium, potassium or calcium hydroxides, etc.; or the solution may comprise that resulting from $H_2SO_4$ attack of titaniferous ores, such as ilmenite, in accordance with well-known procedures, especially those mentioned in U. S. Patents 1,357,690 or 1,504,669.

The manner in which the $TiO_2$ precipitate or hydrolysate is dissolved in the excess of concentrated or dilute sulfuric acid, in accordance with the invention, is also non-critical. As stated, the reaction between the $TiO_2$ and concentrated sulfuric acid is preferably conducted at elevated temperatures, for example, from about, say, 125° C. to 225° C., and with liquid conditions prevailing. For instance, in the preferred embodiment of the invention, an aqueous slurry of the $TiO_2$ precipitate may be mixed with the desired, requisite amount of acid to obtain a final sulfate solution containing not less than about 1.5 nor more than about 3 mols of sulfuric acid per mol of $TiO_2$. Alternatively, the precipitated $TiO_2$ may be in dry state when admixed with the acid, the latter, however, being in sufficient excess to insure a complete reaction and a dry reaction mass as an end product. In the latter event, and prior to further treatment, the titanium sulfate mass is first dissolved in sufficient water to provide a solution in which the desired ratio of sulfuric acid to $TiO_2$ exists. The term "excess concentration," as herein employed, includes the use of amounts greater than the molecular equivalent required for reaction with the $TiO_2$ present.

As already indicated, it is preferable, in successively treating or reacting the titanium sulfate solution with varying forms of an alkaline earth metal chloride, that calcium chloride be used as the initial or starting treating agent. This for the reason that optimum benefits have been found to ensue from such procedure, and hence it will be found essential to the procurement of such results that the sulfate solution be first reacted with an alkaline earth metal chloride adapted to precipitate a more or less slightly water or dilute acid-soluble form of alkaline earth metal sulfate capable of modifying its crystal form by reason of transition from an anhydrous to hydrated phase. Advantageously, precipitates of this type manifest a decided affinity for metallic or other undesired impurities present in the titanium sulfate solution, and these occlude or become adsorbed upon the precipitate to be removed therewith when the precipitate is withdrawn or separated from said solution. Since calcium sulfate possesses these desired characteristics, the use of calcium chloride as an effective agent for initially forming this type of precipitate in the solution is preferred. In the final, successive treatment of the solution with alkaline earth metal chloride, a chloride is selected which has the property of precipitating a relatively insoluble form of precipitate, that is, one which is insoluble in both water and dilute acids. Barium chloride, which reacts to precipitate barium sulfate, has been found the most effective type of treating agent for this purpose, and hence its use as the final treating agent is preferred. By the use of this latter type of treating agent, advantage is taken of the fact that all sulfate ions remaining in the liquor (whether present therein originally or introduced by reason of the previous alkaline earth chloride treatment) become duly and finally acted upon, and due to the highly insoluble nature of the barium sulfate precipitate are completely removed from the solution when it is withdrawn therefrom. As a result, a relatively pure titanium chloride solution is finally obtained which is completely free from all sulfate ions or undesired metallic as well as other undesirable impurity contaminants.

The amount of calcium chloride initially introduced into or admixed with the titanium sulfate solution may vary, although preferably an amount not greater than substantially the chemical equivalent of the sulfates present in said solution is recommended for use. The quantity of calcium chloride employed at this point will affect the sulfate content of the solution, and if large or excess proportions thereof are used, the ultimate titanium chloride solution will contain substantial and objectionable amounts of calcium chloride which may influence and possibly adversely impair the properties of a seed nuclei ultimately prepared from said solution. Hence, to insure optimum results, it has been found best to so regulate the addition or admixture of the calcium salt with the sulfate solution that precipitation of a major proportion only, and say from about 80–90%, of the sulfate content of said solution, will be accomplished. The precipitated calcium sulfate or gypsum is then conveniently removed, as described, the titanium chloride solution at this point preferably ranging in concentration from about 100–150 g. $TiO_2$ per liter and not exceeding from about 50 to 200 g. of $TiO_2$ per liter. After such partial purification and calcium sulfate removal, a solution of barium chloride is then introduced, this addition being so regulated, however, that the presence of any excess barium in said solution is avoided, but is sufficient to react with and remove all sulfate ions as insoluble barium sulfate. Removal of the latter provides the final highly pure titanium chloride solution which, as indicated, is eminently suited for all manners of use, especially in preparing titanium oxide nuclei for employment in titanium liquor hydrolyses, especially solutions of titanium sulfate.

We claim:

1. A process for preparing a pure stable, titanium chloride solution from a substantially iron-free solution of titanium sulfate, comprising interacting said sulfate solution initially with sufficient calcium chloride to precipitate, as calcium sulfate, at least 70% of its sulfate content, removing the precipitated calcium sulfate together with impurities from said solution occluded thereon, then interacting the treated solution with an amount of barium chloride sufficient to precipitate, as barium sulfate, all sulfates remaining in said solution, and then removing said barium sulfate from the relatively pure, sulfate-free titanium chloride solution which results.

2. A process for preparing a pure, stable, titanium chloride solution from a substantially iron-free solution of titanium sulfate obtained through excess sulfuric acid dissolution of a $TiO_2$ precipitate, which comprises interacting said sulfate solution with sufficient calcium chloride sufficient in solution to precipitate, as calcium sulfate, from substantially 70% to 95% of the sulfate ions present therein, removing said precipitate together with its occluded impurities from said sulfate solution, interacting the recovered titanium liquor with an amount of barium chloride sufficient to precipitate, as barium sulfate, sulfates remaining in said liquor, and then recovering the resulting, relatively pure, sulfate-free titanium chloride solution after removal of the barium sulfate precipitate.

3. A process for preparing a pure, stable, titanium chloride solution from a substantially iron-free solution of titanium sulfate obtained by dissolving a $TiO_2$ hydrolysate in excess sulfuric acid, comprising interacting said sulfate solution with sufficient calcium chloride to precipitate, as calcium sulfate, together with its occluded impurities from about 80% to 90% of its total sulfate content, removing said precipitate together with its occluded impurities from said titanium solution, and thence precipitating for removal the residual sulfate ions remaining in said titanium solution by interacting the solution with a substantially equivalent amount of barium chloride.

4. A process for preparing a pure, stable, titanium chloride solution from a substantially iron-free solution of titanium sulfate obtained by dissolving metatitanic acid in an excess quantity of relatively concentrated sulfuric acid, comprising interacting at a temperature ranging from about 35–50° C. said sulfate solution with a solution of calcium chloride sufficient in amount to precipitate from substantially 80% to 90% of the sulfate content of said titanium solution, removing from the titanium solution the calcium sulfate together with occluded impurities from said sulfate solution which precipitates upon said chloride interaction, thereupon interacting the resulting titanium solution with an amount of barium chloride sufficient to substantially completely precipitate as barium sulfate residual sulfates remaining in said titanium solution after said calcium sulfate removal, and then recovering the relatively pure, sulfate-free titanium chloride solution which results after removal therefrom of said barium sulfate precipitate.

5. A process for preparing a pure, stable, titanium chloride solution from a solution of substantially iron-free titanium sulfate containing a molar ratio of $H_2SO_4$ to $TiO_2$ of about 1.5:2.5, said sulfate solution having been obtained by dissolving a $TiO_2$ precipitate in excess sulfuric acid while maintaining liquid conditions and elevated temperatures ranging from about 125° C.–225° C., which comprises interacting said sulfate solution with a solution of calcium chloride sufficient to precipitate from substantially 80–90% of the sulfate content of said titanium solution, removing the calcium sulfate precipitated together with its occluded impurities as a result of said chloride interaction, thence interacting the titanium solution with an amount of barium chloride sufficient to react with substantially all sulfate ions remaining therein and precipitate barium sulfate, and then removing said barium sulfate precipitate from the resulting titanium chloride solution.

6. A process for preparing a pure, stable, titanium chloride solution from a substantially iron-free solution of titanium sulfate containing about 2.7 mols $H_2SO_4$ per mol of $TiO_2$ and obtained by dissolving a $TiO_2$ precipitate from the hydrolysis of a titanium sulfate solution in excess sulfuric acid while maintaining liquid conditions throughout the reaction and elevated temperatures ranging from about 125° C.–225° C., which comprises incorporating in said titanium solution a sufficient quantity of an alkaline agent capable of yielding an insoluble sulfate to reduce its sulfuric acid content to a point where the ratio of acid to titanium is about 1.7 mols of $H_2SO_4$ per mol of $TiO_2$, thence reacting the resulting titanium solution with sufficient calcium chloride to precipitate as calcium sulfate from about 80–90% of the sulfate content of said titanium solution, removing said calcium sulfate precipitate together with its occluded impurities from said sulfate solution and subjecting the resulting titanium liquor to interaction with an amount of barium chloride sufficient to substantially completely precipitate as barium sulfate any sulfates remaining in said titanium solution, and then removing said barium sulfate precipitate from the resulting titanium chloride solution.

CARL MARCUS OLSON.
IGNACE JOSEPH KRCHMA.

REFERENCES CITED

The following references are of record in the file of this patent:

UNITED STATES PATENTS

| Number | Name | Date |
| --- | --- | --- |
| Re. 18,854 | Blumenfeld | May 30, 1933 |
| 657,453 | Rothberg | Sept. 4, 1900 |
| 1,189,229 | Barton | July 4, 1916 |
| 1,272,855 | Rossi | July 16, 1918 |
| 1,333,819 | Jebsen | Mar. 16, 1920 |
| 1,357,690 | Coffelt | Nov. 2, 1920 |
| 1,504,670 | Blumenfeld | Aug. 12, 1924 |
| 1,707,257 | De Rohden | Apr. 2, 1929 |
| 1,980,812 | Llewellyn et al. | Nov. 13, 1934 |
| 2,183,365 | Booge | Dec. 12, 1939 |
| 2,321,490 | Keats | June 8, 1943 |
| 2,345,985 | McKinney et al. | Apr. 4, 1944 |

OTHER REFERENCES

Handbook of Chemistry and Physics, 16th edition, pp. 214, 224 (pub. Sept. 1931). Pub. by Chemical Rubber Publ. Co.

Scott: "Standard Methods of Chemical Analysis," 4th ed, vol. I, p. 497.

Certificate of Correction

Patent No. 2,486,572 November 1, 1949

CARL MARCUS OLSON ET AL.

It is hereby certified that errors appear in the printed specification of the above numbered patent requiring correction as follows:

Column 1, line 20, for "attarctive" read *attractive*; line 55, for "1000° ." read *1000° C.*; column 3, line 6, for "apparaent" read *apparent*; column 7, lines 36 and 37, strike out the words "together with its occluded impurities";

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*